US012227955B2

(12) United States Patent
Lofberg et al.

(10) Patent No.: US 12,227,955 B2
(45) Date of Patent: Feb. 18, 2025

(54) FASTENING ARRANGEMENT, POLE, ACCESS CONTROL DEVICE, DESTINATION CONTROL DEVICE AND METHOD OF MOUNTING A POLE

(71) Applicant: Kone Corporation, Helsinki (FI)

(72) Inventors: Niklas Lofberg, Helsinki (FI); Mika Hautamaki, Helsinki (FI); Tapio Gronros, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/364,641

(22) Filed: Aug. 3, 2023

(65) Prior Publication Data

US 2023/0374812 A1 Nov. 23, 2023

Related U.S. Application Data

(63) Continuation of application No. PCT/EP2021/057866, filed on Mar. 26, 2021.

(51) Int. Cl.
*E04H 12/22* (2006.01)
*E04B 1/41* (2006.01)
*E06B 11/08* (2006.01)

(52) U.S. Cl.
CPC ....... *E04H 12/2261* (2013.01); *E04B 1/4164* (2013.01); *E06B 11/08* (2013.01)

(58) Field of Classification Search
CPC . E04H 12/2261; E04H 12/2253; E06B 11/08; E04B 1/4157; E04B 1/4164
See application file for complete search history.

(56) References Cited

U.S. PATENT DOCUMENTS 4,990,043 A * 2/1991 Hafeli ................... F16B 39/284
411/937.1
2023/0374812 A1* 11/2023 Lofberg .............. E04H 12/2261

FOREIGN PATENT DOCUMENTS

GB 2417500 A 3/2006
KR 101582316 B1 1/2016

OTHER PUBLICATIONS

Office Action issued Jun. 6, 2024 in Chinese Application No. 202190001021.9.

(Continued)

*Primary Examiner* — Andrew J Triggs
(74) *Attorney, Agent, or Firm* — Harness, Dickey & Pierce, P.L.C.

(57) ABSTRACT

The fastening arrangement for fastening a pole of an access or destination control device to a floor structure comprises a threaded fastening rod attachable to the floor, a fastening sleeve comprising a flange, a sleeve portion, and an internal thread configured to be engaged with the thread of the rod, the sleeve portion comprising coupling means for allowing the sleeve to be engaged in a form-locking manner for rotation of the fastening sleeve, a fastening block at a lower end of the pole comprising a fastening hole extending from a lower surface to an upper surface for receiving part of the fastening rod and at least part of the sleeve portion so that the fastening block is supported by the flange of the fastening sleeve, and clamping means configured to be engaged with the upper surface of the fastening block and the thread of the fastening rod for clamping the fastening block between the flange and the clamping means.

15 Claims, 5 Drawing Sheets

(56) References Cited

OTHER PUBLICATIONS

International Search Report for International Application No. PCT/EP2021/057866 dated Nov. 30, 2021.
Written Opinion of the International Searching Authority for International Application No. PCT/EP2021/057866 dated Nov. 30, 2021.

* cited by examiner

FASTENING ARRANGEMENT, POLE, ACCESS CONTROL DEVICE, DESTINATION CONTROL DEVICE AND METHOD OF MOUNTING A POLE

CROSS-REFERENCE TO RELATED APPLICATION

This application is a continuation of PCT International Application No. PCT/EP2021/057866 which has an International filing date of Mar. 26, 2021, the entire contents of which are incorporated herein by reference.

TECHNICAL FIELD OF THE INVENTION

The invention relates to a fastening arrangement for fastening a pole of an access or destination control device to a floor, as defined in claim 1. The invention also concerns a method of mounting a pole of an access or destination control device, as defined in the other independent claim. The invention further concerns a pole of an access or destination control device, an access control device and a destination control device.

BACKGROUND OF THE INVENTION

Different access control gates, often referred to as turnstiles, are often an essential part of controlling the flow of people in different buildings. Turnstiles are used, for instance, in office buildings, hospitals, educational facilities, hotels, airports and other transit centers. Turnstiles are used for preventing access of unauthorized persons to certain places and to guide and monitor the flow of people.

Turnstiles are typically provided with a rotatable tripod or with one or two turning leaf elements or arms to prevent passage of unauthorized persons. Certain access control gates do not comprise any physical barrier for preventing passage of unauthorized people, but the passage or approach of an unauthorized person can trigger an alarm.

Turnstiles can comprise different access control means for determining whether a person is authorized to pass through. Turnstiles can also be provided with different security features, for instance for preventing tailgating and crawling under the gate and for detecting children and baggage.

Many existing turnstile solutions have a large footprint. This is problematic in many places, for instance in high-rise buildings, where the lobby space can be very valuable. Also turnstiles with slim poles are known. A typical way of attaching such a pole to the floor is to arrange a strong steel tube in the concrete cast of the floor. This kind of attachment solution has many disadvantages. For instance, the level of the pole cannot be adjusted after casting of the floor. Also, the steel tube needs to be installed in an early phase of the construction work, and because the tube extends above the finished floor level, it forms an obstacle during the construction work and also later during possible renovation of the building. The solution also provides a very limited space and flexibility for cabling and the steel tube requires a lot of space inside the pole limiting thus the possibilities to place other components within the pole.

Similar problems are encountered with existing fastening solutions for the pedestals of the operating panels of destination control systems. Destination control systems can be used in buildings that are equipped with several elevators to optimize the use of the elevators. Users of the elevators select their destination from a destination operating panel or with a mobile app, and the display of the operating panel tells each user which elevator has been assigned to him or her.

SUMMARY OF THE INVENTION

An object of the present invention is to provide an improved fastening arrangement for fastening a pole of an access or destination control device to a floor structure. The characterizing features of the arrangement according to the invention are given in claim 1. Another object of the invention is to provide an improved method for mounting a pole of an access or destination control device. The characterizing features of the method according to the invention are given in the other independent claim. Other objects of the invention are to provide an improved pole of an access or destination control device, an improved access control device and an improved destination control device.

The fastening arrangement according to the invention comprises

- at least one fastening rod having a lower end and an upper end, the fastening rod being attachable to the floor structure in an upright position and comprising a threaded portion with an external thread,
- a fastening sleeve having a lower end and an upper end and being arrangeable around the fastening rod, the fastening sleeve comprising a flange and a sleeve portion, the fastening sleeve being provided with an internal thread configured to be engaged with the external thread of the fastening rod, and the sleeve portion being provided with coupling means for allowing the upper end of the fastening sleeve to be engaged in a form-locking manner for rotation of the fastening sleeve,
- a fastening block arranged at a lower end of the pole of the access or destination control device and having a lower surface and an upper surface, the fastening block comprising a fastening hole extending from the lower surface to the upper surface, the fastening hole being configured to receive part of the fastening rod and at least part of the sleeve portion of the fastening sleeve arranged around the fastening rod so that the lower surface of the fastening block is supported by the flange of the fastening sleeve, and
- clamping means that are configured to be engaged with the upper surface of the fastening block and the thread of the fastening rod for clamping the fastening block between the flange of the fastening sleeve and the clamping means.

The fastening arrangement according to the invention allows convenient height adjustment of the pole. Because of the coupling means of the fastening sleeve, the height of the pole can be adjusted from above the fastening block. The fastening arrangement is also space efficient.

The method according to the invention for mounting a pole comprising a fastening arrangement defined above comprises the steps of

- fastening the fastening rod(s) to the floor structure,
- arranging each fastening sleeve around a respective fastening rod at an initial position,
- supporting the pole against the flange(s) of the fastening sleeve(s),
- checking the angle and the height of the pole,
- optionally, adjusting the angle and/or the height of the pole by rotating at least one fastening sleeve, and
- using the clamping means for fixing the pole to the desired position.

The method according to the invention allows initial positioning of the pole and later adjustment of the height and/or inclination of the pole if needed. This is beneficial especially in case the poles of two adjacent access control gates are located next to each other. The poles can be adjusted at any phase of the mounting to the same level.

According to an embodiment of the invention, the lower end of the fastening rod is provided with an external thread for attaching the fastening rod to the floor structure. This allows the fastening rods to be fastened to the floor structure in an easy manner in a late phase of construction work. The period of time having the rods protruding from the floor can thus be minimized, which improves safety at a construction or renovation site.

According to an embodiment of the invention, the arrangement comprises a mounting part that is attachable to the floor structure, the mounting part comprising a mounting sleeve for receiving the lower end of the fastening rod. This allows easy mounting of the fastening rods.

According to an embodiment of the invention, the coupling means of the fastening sleeve comprise at least one tooth extending upwards from an upper end surface of the sleeve portion or at least one notch extending downwards from the upper end surface.

According to an embodiment of the invention, the clamping means comprise a first part that is configured to be engaged with the upper surface of the fastening block and a second part that is configured to be engaged with the thread of the fastening rod for clamping the first part against the fastening block.

According to an embodiment of the invention, the first part of the clamping means is an adjustment sleeve, which is provided with coupling means that are configured to be engaged in a form-locking manner with the coupling means of the fastening sleeve for allowing rotation of the fastening sleeve by rotating the adjustment sleeve. The fastening sleeve can thus be rotated by rotating the adjustment sleeve, which allows easy height adjustment of the pole.

According to an embodiment of the invention, the outer perimeter of the adjustment sleeve comprises a portion with a hexagonal shape for allowing rotation of the adjustment sleeve by a wrench. No special tools are thus needed for the height adjustment.

According to an embodiment of the invention, the second part of the clamping means is a nut. The whole height adjustment and fixing process of the pole can thus be done using ordinary workshop tools.

According to an embodiment of the invention, the arrangement comprises at least two fastening rods and a corresponding number of fastening sleeves, fastening holes and clamping means. With two fastening rods, inclination of the pole in one direction can be adjusted in addition to the height adjustment.

According to an embodiment of the invention, the arrangement comprises three fastening rods, which are arranged in a triangular formation in the plane of the floor structure. This allows adjustment of the inclination in all directions.

A pole of an access or destination control device according to the invention comprises a fastening arrangement defined above.

An access control device or a destination control device according to the invention comprises a pole defined above.

BRIEF DESCRIPTION OF THE DRAWINGS

Embodiments of the invention are described below in more detail with reference to the accompanying drawings, in which.

DETAILED DESCRIPTION OF EMBODIMENTS OF THE INVENTION

Figure 1:
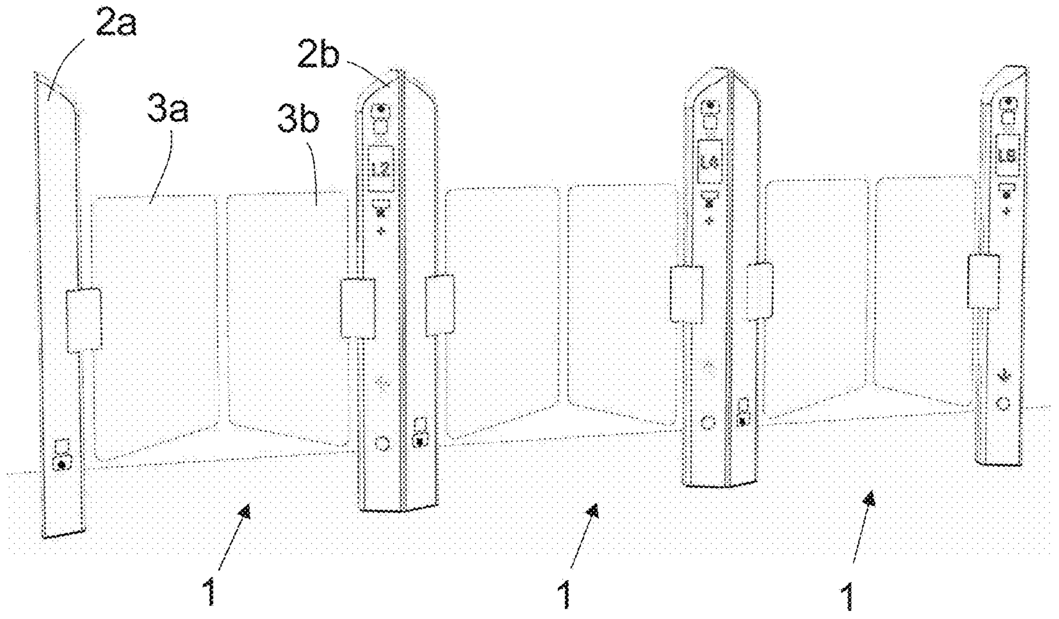
FIG. 1 shows a group of turnstiles according to an embodiment of the invention.
Figure 2:
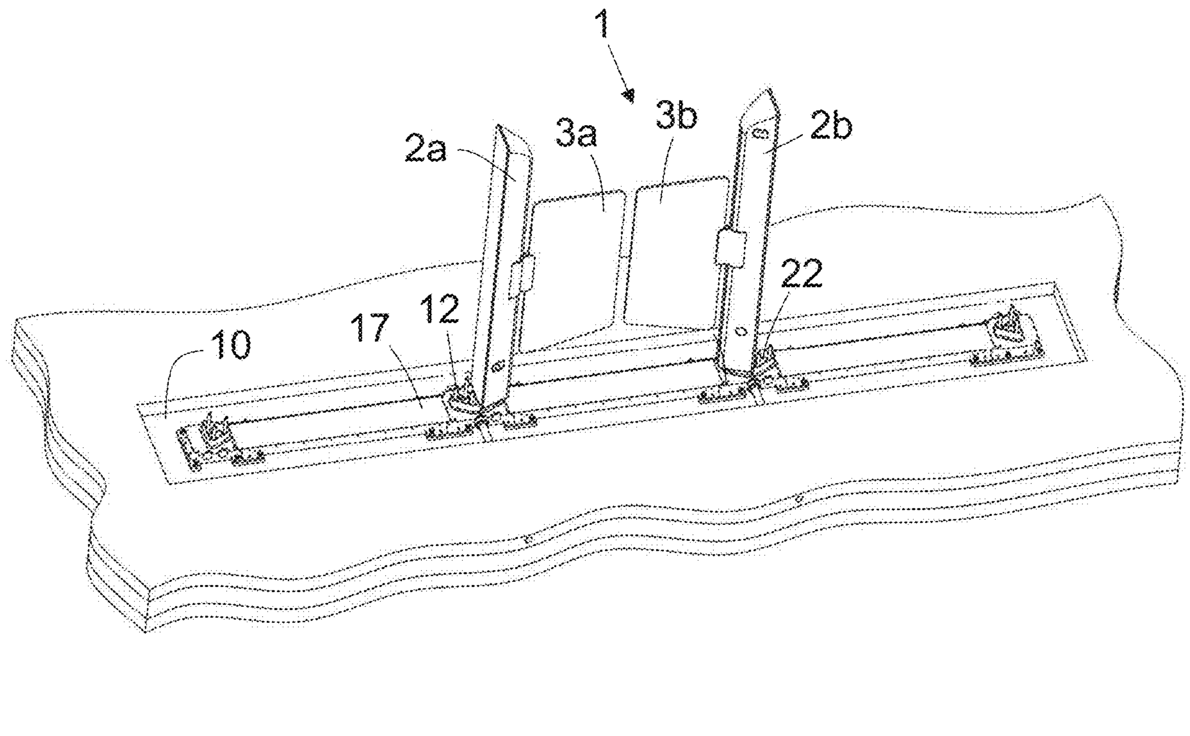
FIG. 2 shows one of the turnstiles of FIG. 1 and part of fastening means of the turnstiles.
Figure 3:
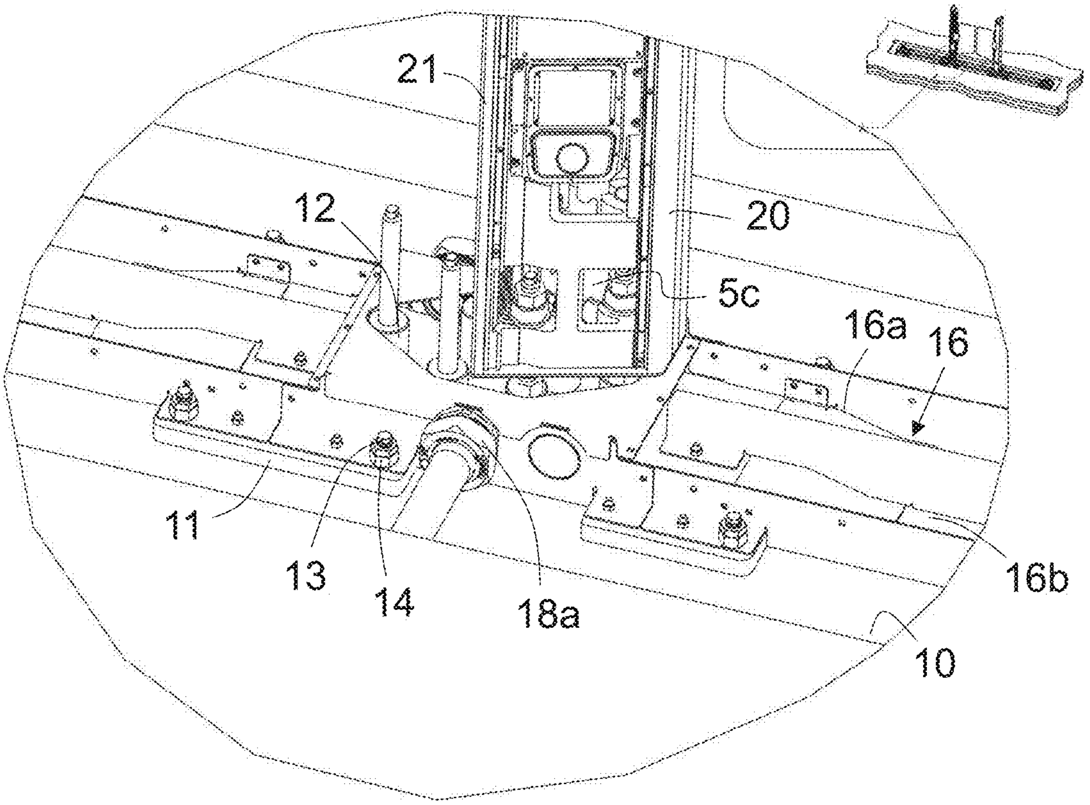
FIG. 3 shows a front view of a fastening arrangement for a pole of a turnstile.
Figure 4:
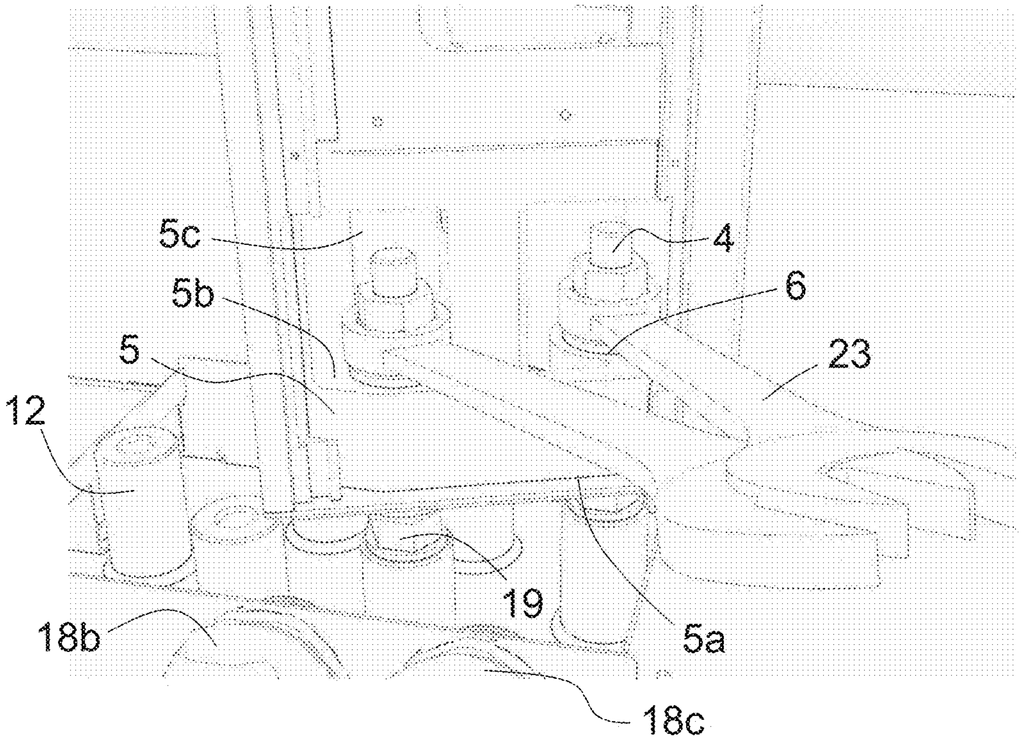
FIG. 4 shows a rear view of the fastening arrangement.
Figure 5:
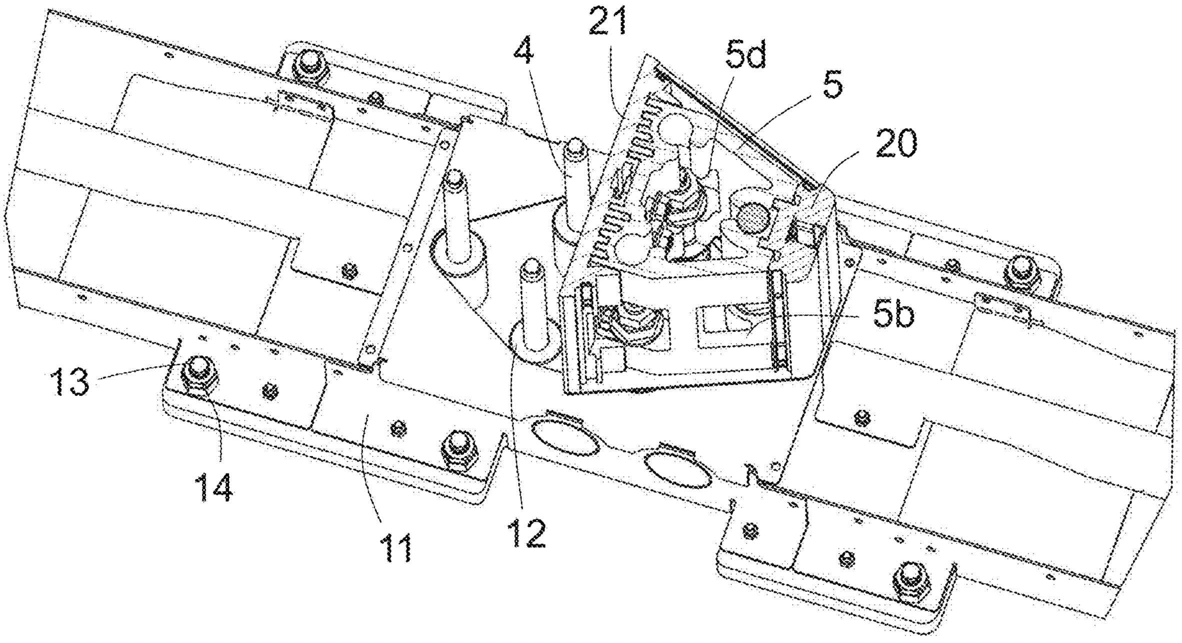
FIG. 5 shows a cut perspective view of the fastening arrangement.
Figure 6:
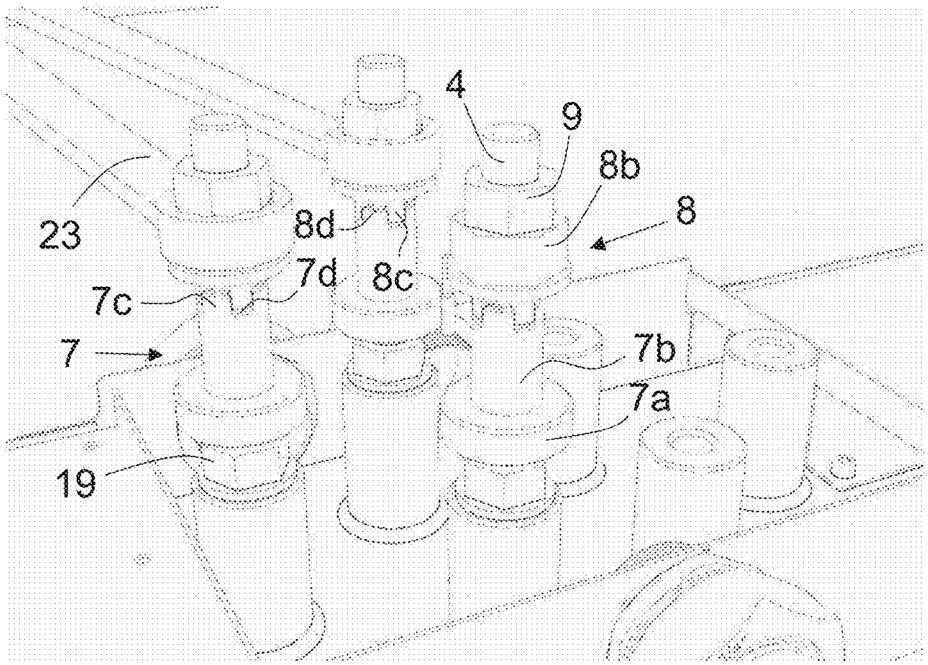
FIG. 6 shows height adjustment parts of the fastening arrangement.
Figure 7:
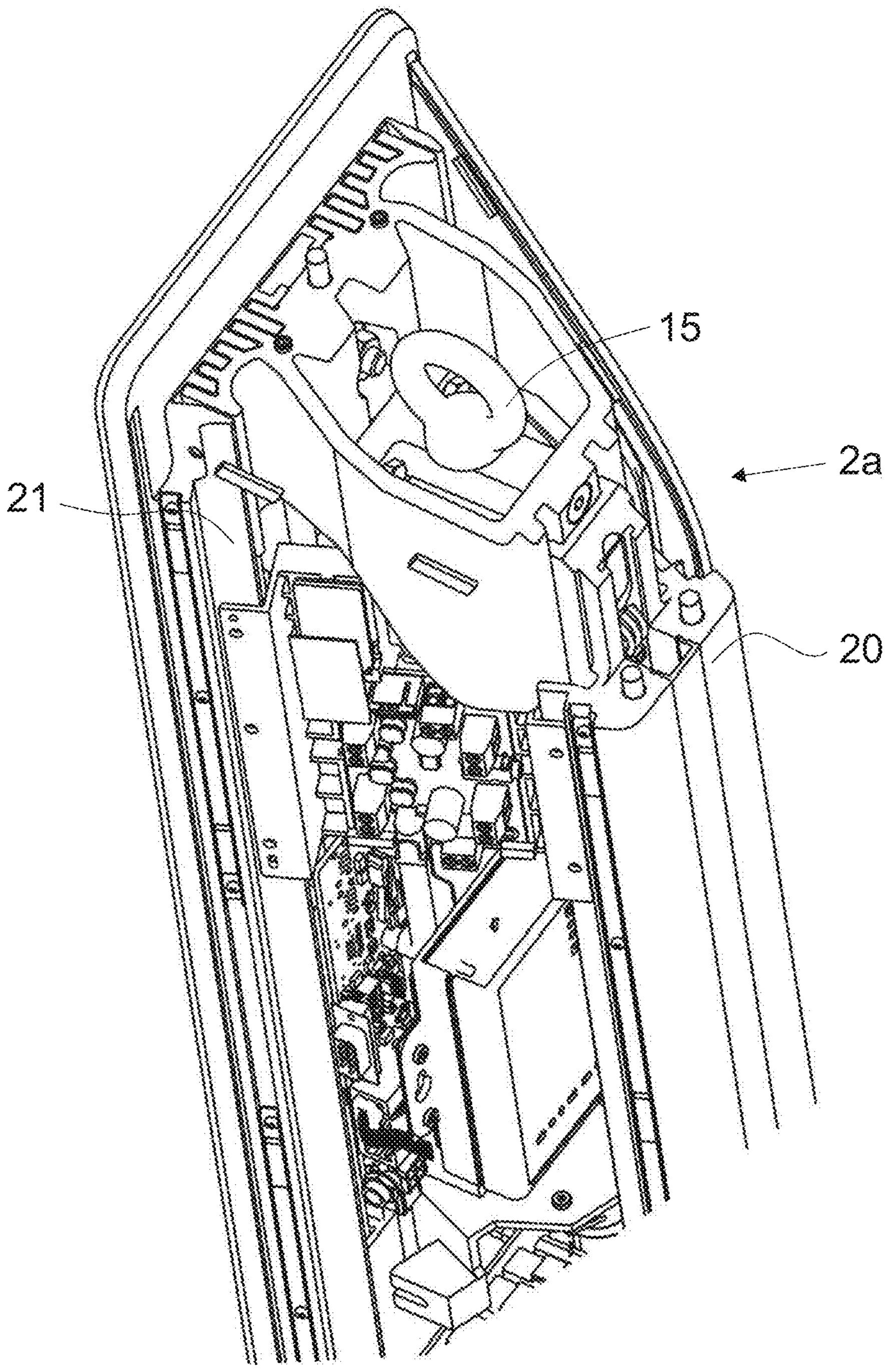
FIG. 7 shows a view of an upper part of a pole of the turnstile.
Figure 8:
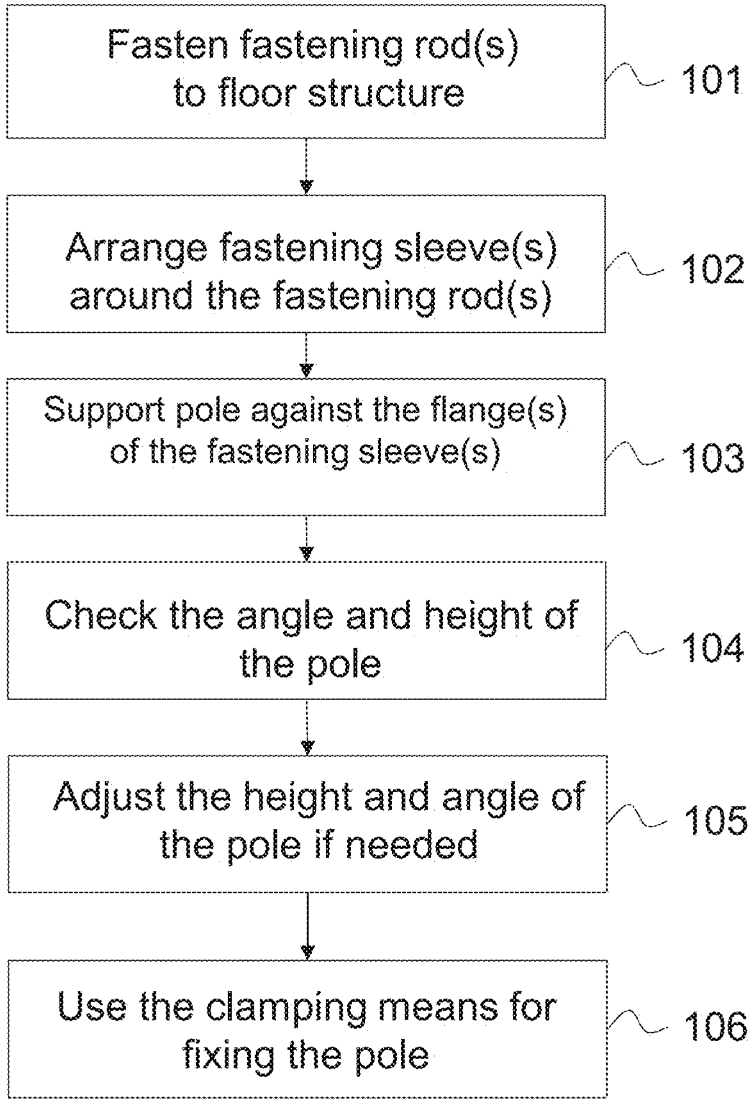
FIG. 8 shows the method according to the invention as a flowchart.

FIG. 1 shows a group of three turnstiles 1 according to an embodiment of the invention. The term "turnstile" refers here to a gate that can be used for controlling and/or monitoring access of people from a room or an area to another room or area or for controlling flow of people. The turnstiles 1 could also be referred to as access control gates or access control devices.

Turnstiles can be used, for instance, in office buildings, hotels, medical facilities, airports, railway stations, subway stations, bus terminals or other transit centers, educational facilities or multi-purpose buildings. In the embodiment of the figures, the turnstiles 1 are provided with barrier elements 3*a*, 3*b* for preventing passage of unauthorized persons. However, the term "turnstile" is used here to cover also such access control gates that do not comprise any barrier element. Such a gate could detect and possibly identify a person approaching or passing the gate. If the person is not authorized to pass the gate, denied access could be indicated by a visual or an audible signal or by both ways. The denied access can be indicated with means that are integrated into the gate. The gate could be provided with a display, light or other visual indicator for indicating whether access is denied or allowed. Alternatively, or in addition, the gate could be provided with a loudspeaker for giving an audible signal for indicating whether access is denied or allowed. Instead of or in addition to providing the gate with means for indicating whether access is denied or allowed, a separate device communicating with the gate could be used for indicating whether access is denied or allowed. For instance, a separate display, light or loudspeaker could be arranged in the vicinity of the gate. Alternatively, or in addition, the gate could communicate with a remotely located device. For instance, the gate could communicate with a display or other device located in a control room.

A gate without physical barrier elements could also be used, for instance, for monitoring the people passing the gate. Such monitoring could include identifying the people passing the gate.

In the embodiment of FIG. 1, each turnstile 1 comprises two poles 2*a*, 2*b* and one barrier element 3*a*, 3*b* attached to each pole 2*a*, 2*b*. However, the turnstile 1 could also comprise a single pole and a single barrier element attached to said pole. Such a turnstile could be used, for instance, in a narrow corridor. Also, in a group of turnstiles, each turnstile 1 could comprise one pole and one barrier element. In such a group, the barrier elements could be between the poles of two adjacent turnstiles. At the ends of the group of turnstiles, the barrier elements could be between a wall or other fixed construction and the pole of the respective turnstile.

In the embodiment of FIG. 1, the barrier element 3*a*, 3*b* is a plate element that is made of a polycarbonate. The plate element could also be made of some other plastic material. Alternatively, it could also be made of toughened and/or laminated glass. Instead of a plate element, the barrier element 3*a*, 3*b* could be for instance a frame made from tubular parts. The barrier element 3*a*, 3*b* could also have a shape of a boom or arm. In the embodiment of the figures, the rotation axis of the barrier element 3*a*, 3*b* is vertical. However, the rotation axis of the barrier element 3*a*, 3*b* could also be parallel to the direction in which the turnstile 1 is passed, especially if the barrier element was a boom or an arm. The barrier element 3*a*, 3*b* could also be a tripod, of which rotation axis is horizontal and transversal to the direction in which the turnstile 1 is passed. The barrier element could also be attached to the pole 2*a*, 2*b* via two or more points. The barrier element could be a retractable and foldable element.

In the embodiment of the figures, the upper edge of the barrier element 3*a*, 3*b* is at the height of approximately 1100 mm. The height of the poles 2*a*, 2*b* is approximately 1500 mm. The upper edge of the barrier element 3*a*, 3*b* can be arranged to be at a height of 800-1200 mm from the floor. However, the barrier element 3*a*, 3*b* could also extend higher.

Turnstiles provided with a barrier element can be either normally open or normally closed. A normally closed turnstile opens when it is determined that the person at the gate is authorized to pass the gate. A normally open turnstile is closed if it is determined that the person is not authorized to pass the gate.

Turnstiles can be provided with different sensors and devices for different purposes, for instance for determining whether a person is authorized to pass the gate and for ensuring safety and security. A turnstile can be provided with a reader for reading an identification tag for determining whether a person is authorized to pass the gate. The reader could be, for instance, a barcode reader, QR code reader, NFC reader or RFID reader. Alternatively or in addition, the turnstile could comprise means for biometric identification of people. The turnstile could comprise, for instance, a fingerprint scanner, an iris scanner or means for facial recognition.

The poles 2*a*, 2*b* of the turnstiles 1 are attached to a floor structure 10 with a fastening arrangement. Parts of a fastening arrangement according to an embodiment of the invention can be seen in FIGS. 2 to 5.

The fastening arrangement according to the invention comprises at least one fastening rod 4 having a lower end and an upper end. The expressions "lower end" and "upper end" refer here to the position of the fastening rod 4 in an assembled state. The lower end of the fastening rod 4 is attachable to the floor structure 10. At least part of the fastening rod 4 is provided with an external thread. The fastening rod 4 can be made of steel.

The fastening arrangement further comprises a fastening sleeve 7 having a lower end and an upper end. Again, the expressions "lower" and "upper" refer to an assembled state of the fastening sleeve 7. The fastening sleeve 7 can be arranged around the fastening rod 4. The fastening sleeve 7 comprises a flange 7*a* and a sleeve portion 7*b*. The fastening sleeve 7 is provided with an internal thread that is configured to be engaged with the external thread of the fastening rod 4. The thread of the fastening sleeve 7 can extend from one end of the fastening sleeve 7 to the opposite end, but that is not necessary. The thread could extend only over a portion of the length of the fastening sleeve 7. In an assembled state of the fastening sleeve 7, the threaded portion of the fastening rod 4 is configured to extend above the upper end of the fastening sleeve 7.

The fastening sleeve 7 is further provided with coupling means 7*c*, 7*d* for allowing the upper end of the fastening sleeve 7 to be engaged in a form-locking manner for rotating the fastening sleeve 7. Another part of the fastening arrangement or a tool can thus be coupled with the coupling means 7*c*, 7*d* of the fastening sleeve 7.

The fastening arrangement further comprises a fastening block 5 that is arranged at the lower end of the pole 2*a*, 2*b* of the turnstile 1. The fastening block 5 has a lower surface 5*a* and an upper surface 5*b*. The fastening block 5 comprises a fastening hole 6, which extends from the lower surface 5*a* to the upper surface 5*b*. The fastening hole 6 is configured to receive part of the fastening rod 4 and at least part of the sleeve portion 7*b* of the fastening sleeve 7 arranged around the fastening rod 4 so that the lower surface 5*a* of the fastening block 5 is supported against the fastening sleeve 7. In an assembled state of the fastening block 5, the fastening rod 4 extends above the upper surface of the fastening block 5. The expressions "lower surface" and "upper surface" mean that in an assembled state of the fastening block 5, the upper surface 5*b* is above the lower surface 5*a*. The upper surface 5*b* is thus not necessarily the uppermost surface of the fastening block 5, but part of the fastening block 5 can extend above the upper surface 5*b*. In the embodiment of the figures, the upper surface 5*b* is arranged in a cavity 5*c* of the fastening block 5. The fastening block 5 can be made of for example aluminum or steel. In the embodiment of the figures, the body of the pole 2*a*, 2*b* is formed by aluminum profiles 20, 21 extending in the vertical direction. The aluminum profiles 20, 21 are attached to the fastening block 5. However, the fastening block 5 could also be an integral part of the body of the pole 2*a*, 2*b*. The fastening block 5 could thus extend over a major part of the height of the pole 2*a*, 2*b*. The fastening block 5 is provided with an aperture 5*d*, which allows data and power cables to be guided from below the pole 2*a*, 2*b* into the pole 2*a*, 2*b*.

The fastening arrangement further comprises clamping means 8, 9 that are configured to be engaged with the upper surface 5*b* of the fastening block 5 and the thread of the fastening rod 4 for clamping the fastening block 5 between the flange 7*a* of the fastening sleeve 7 and the clamping means 8, 9.

By rotating the fastening sleeve 7, it moves in the vertical direction along the fastening rod 4. Because the lower surface 5*a* of the fastening block 5 is supported against the flange 7*a* of the fastening sleeve 7, the vertical position of the fastening block 5 can be adjusted by rotating the fastening sleeve 7. The fastening sleeve 7 can be rotated from above the upper surface 5*b* of the fastening block 5. This makes height adjustment of the pole 2*a*, 2*b* convenient, as tools do not need to be inserted below the fastening block 5.

Also the lower end of the fastening rod 4 can be provided with an external thread. In the embodiment of the figures, the fastening rod 4 is provided with a thread that extends from the lower end to the upper end. By means of the thread at the lower end of the fastening rod 4, the fastening rod 4 can be attached to the floor structure 10. In the embodiment of the figures, the fastening arrangement comprises a mounting part 11 that is attachable to the floor structure 10. The mounting part 11 comprises a mounting sleeve 12 for receiving the lower end of the fastening rod 4. The fastening rod 4 can thus be attached to the mounting part 11. The mounting part 11 can be attached to the floor structure at an early phase of construction or renovation work of the building where the turnstile 1 is used. The fastening rod 4 can be attached to the mounting part 11 at a later phase of the construction or renovation work, for instance after finishing of the final floor surface. This increases the safety of the construction site, as the period of time when the fastening rods 4 are protruding from the floor can be minimized. The fastening rod 4 can be fixed to the mounting sleeve 12 by means of a nut 19.

In the embodiment of the figures, the mounting part 11 is attached to the floor structure 10 by means of threaded rods 13 and nuts 14. In the embodiment of the figures, some of the mounting parts 11 are provided with mounting sleeves 12 for the fastening rods 4 of two adjacent turnstiles 1. This ensures that the poles 2*a*, 2*b* of the adjacent turnstiles 1 are arranged tightly against each other.

In the embodiment of the figures, the coupling means 7*c*, 7*d* of the fastening sleeve 7 comprise a toothing arranged at the upper end of the sleeve portion 7*b*. The upper end of the sleeve portion 7*b* thus comprises alternating teeth 7*c* and notches 7*d*.

In the embodiment of the figures, the clamping means 8, 9 comprise a first part 8 that is configured to be engaged with the upper surface 5*b* of the fastening block 5 and a second part 9 that is configured to be engaged with the thread of the fastening rod 4 for clamping the first part 8 against the fastening block 5. In the embodiment of the figures, the first part 8 of the clamping means 8, 9 is an adjustment sleeve 8, which is provided with coupling means 8*c*, 8*d* that are configured to be engaged in a form-locking manner with the coupling means 7*c*, 7*d* of the fastening sleeve 7 for allowing rotation of the fastening sleeve 7 by rotating the adjustment sleeve 8. The coupling means of the adjustment sleeve 8 thus comprise a toothing 8*c*, 8*d*, which can be engaged with the toothing 7*c*, 7*d* of the fastening sleeve 7. The adjustment sleeve 8 has no internal thread. It can thus be rotated freely about the fastening rod 4.

The coupling means of the fastening sleeve 7 and the adjustment sleeve 8 could be implemented in many different ways. For instance, the fastening sleeve 7 could be provided with a single tooth 7*c* extending upwards from an upper end surface of the sleeve portion 7*b* and the adjustment sleeve 8 could be provided with a notch 8*d* that is configured to be engaged with the tooth of the sleeve portion 7*b* of the fastening sleeve 7. Alternatively, the fastening sleeve 7 could be provided with a single notch 7*d* extending downwards from the upper end surface of the sleeve portion 7*b* and the adjustment sleeve 8 could be provided with a tooth 8*c* that is configured to be engaged with the notch 7*d* of the sleeve portion 7*b* of the fastening sleeve 7. The fastening sleeve 7 could also be provided with two or more teeth 7*c* or notches 7*d* and the adjustment sleeve with a corresponding number of notches 8*d* or teeth 8*c*. It is not necessary that the number of notches and teeth in the fastening sleeve 7 and the adjustment sleeve 8 is equal. For instance, the fastening sleeve 7 could comprise several notches 7*d* and the adjustment sleeve 8 could comprise a single tooth 8*c* that could be engaged with any of the notches 7*d*.

Instead of a toothing, the coupling means of the fastening sleeve 7 could comprise one or more holes extending downwards from the upper end of the sleeve portion 7*b* of the fastening sleeve 7, and the coupling means of the adjustment sleeve 8 could comprise one or more pins that are configured to protrude into the holes. Alternatively, the adjustment sleeve 8 could be provided with at least one hole and the fastening sleeve 7 could be provided with a pin, or both parts 7, 8 could we provided with both a hole and a pin.

The sleeve portion 7*b* of the fastening sleeve 7 could be configured to extend above the upper surface 5*b* of the fastening block 5. In that case, the coupling means could be arranged on the outer perimeter of the fastening sleeve 7. The inner perimeter of the adjustment sleeve 8 could be provided with corresponding coupling means. The adjustment sleeve 8 is not an essential part of the fastening arrangement. The fastening sleeve 7 could also be rotated by a suitable tool that can be engaged with the coupling means of the fastening sleeve 7.

In the embodiment of the figures, the outer perimeter of the adjustment sleeve 8 comprises a portion 8*b* with a hexagonal shape for allowing rotation of the adjustment sleeve 8 by a wrench 23. The adjustment sleeve 8 can thus be rotated using an ordinary wrench and no special tool is required. However, the outer perimeter of the adjustment sleeve 8 could also have some other shape, such as a square shape. Also a square shape and even some other rectangular shape would allow rotation of the adjustment sleeve 8 using a wrench. Even some other than a rectangular shape could be used, but then a special tool would be required.

In the embodiment of the figures, the second part 9 of the clamping means 8, 9 is a nut. The second part 9 can thus be tightened against the adjustment sleeve 8 by using a wrench. The second part does not need to be a nut, but it could be some other part that is provided with an internal thread that is configured to be engaged with the thread of the fastening rod 4. If the fastening arrangement was not provided with the adjustment sleeve 8, the clamping means could be formed by a single part that would be tightened directly against the upper surface 5*b* of the fastening block 5. In that case, the fastening sleeve 7 could extend above the upper surface 5*b* of the fastening block 5 and could be rotated by a tool. The clamping means 8, 9 could comprise a single part having a lower end that is arrangeable around the fastening sleeve 7 and an upper end that is provided with a thread that can be engaged with the thread of the fastening rod 4.

In the embodiment of the figures, the fastening arrangement comprises three fastening rods 4 and a corresponding number of the fastening sleeves 7, fastening holes 6 and clamping means 8, 9. The fastening rods 7 are arranged in a triangular formation in the plane of the floor structure 10. Three fastening rods 4 allow the angle of the pole 2*a*, 2*b* to be adjusted in any direction. In the embodiment of the figures, all the fastening holes 6 are arranged in the same fastening block 5, which is formed as a one-piece part.

One fastening rod 4 would allow only height adjustment and two fastening rods 4 would allow the angle of the pole 2*a*, 2*b* to be adjusted only in one direction. More than three fastening rods 4 would not provide any significant benefit compared to an arrangement with three fastening rods 4, but would make the mounting of the pole 2*a*, 2*b* more time-consuming. Therefore, in many applications three fastening rods 4 is an optimal number. However, in some applications it could be sufficient to have an adjustable height of the pole 2*a*, 2*b*, and a single fastening rod 4 could thus be used.

Each pole 2*a*, 2*b* can be provided with a power connection for supplying electrical power to the pole 2*a*, 2*b* and with a data connection for transmitting data to the pole 2*a*, 2*b* and from the pole 2*a*, 2*b*. In the embodiment of the figures, the group of turnstiles 1 is provided with a cable trough 16 for accommodating data and power cables between the poles 2*a*, 2*b*. The cable trough 16 is divided into a first section 16*a* that is configured to accommodate data cables and into a second section 16*b* that is configured to accommodate power cables. The cable trough 16 is arranged on the floor structure 10 onto which the mounting parts 11 are mounted. After installing the power and data cables, the cable trough 16 can be covered by a cover plate 17. After covering of the cable trough 16, the floor surface can be finished for example by casting concrete, even if the poles 2*a*, 2*b* of the turnstiles 1 have not yet been mounted. It is sufficient to leave to the floor openings 22 allowing access to the mounting sleeves 12 of the mounting parts 11.

The data and power connections needed by a group of turnstiles 1 can be brought to the group of turnstiles 1 at one of the poles 2*a*, 2*b* and distributed to the other poles 2*a*, 2*b* via the cable trough 16. One of the mounting parts 11 can comprise one or more bushings 18*a*, 18*b*, 18*c* for bringing the data and power cables to the pole 2*a*, 2*b*.

The pole 2*a*, 2*b* can be mounted as described below. In a first step 101 of mounting a pole 2, 2*b*, the fastening rods 4 are fastened to the floor structure 10. The fastening rods 4 could be attached directly to a concrete slab or to concrete cast in situ, but preferably the mounting parts 11 described above are used. In case the mounting parts 11 are used, the fastening rods 4 can be attached to the mounting parts 11 either before or after fastening the mounting parts 11 to the floor structure 10. If the mounting parts 11 are first attached to the floor structure 10, the time interval between the fastening of the mounting parts 11 and the fastening of the fastening rods 4 can be long. The mounting parts 11 can be fastened to the floor structure at an early phase of construction work, whereas it can be beneficial to delay the mounting of the fastening rods 4 to a later phase of the construction work in order to avoid having the rods 4 protruding from the floor for a long period of time.

In a second step 102 of the method, the fastening sleeves 7 are arranged around the fastening rods 4. Each fastening rod 4 is rotated to an initial position. The initial position is preferably close to the expected final position of the fastening sleeve 7.

In a third step 103 of the method, the pole 2*a*, 2*b* is supported against the flanges 7*a* of the fastening sleeves 7. The fastening holes 6 of the fastening block 5 are thus aligned with the fastening rods 4 and the fastening sleeves 7, and the sleeve portions 7*b* of the fastening sleeves 7 are inserted into the fastening holes 6. Depending on the weight and size of the poles 2*a*, 2*b*, lifting means may be needed for lifting the pole 2*a*, 2*b* to its initial position. For instance a workshop crane may be used for lifting the pole 2*a*, 2*b*. In the embodiment of the figures, the pole 2*a*, 2*b* is provided with a lifting eye 15, which is arranged at an upper end of the pole 2*a*, 2*b*. A lifting hook or other means of the crane can be engaged with the lifting eye 15 for lifting the pole 2*a*, 2*b*. Before lowering the pole 2*a*, 2*b* onto the fastening sleeves 7, the power and data cables are connected to the pole 2*a*, 2*b*.

In a fourth step 104 of the method, the angle and the height of the pole 2*a*, 2*b* are checked. It is thus checked whether the pole 2*a*, 2*b* is at a correct height and stands straight.

In a fifth step 105 of the method, the height and/or the angle of the pole 2*a*, 2*b* are adjusted if needed by rotating one or more of the fastening sleeves 7. The fastening sleeves 7 are rotated by rotating the respective adjustment sleeves 8 by means of a wrench 23. This step is optional. If the initial positions of the fastening sleeves 7 are sufficiently close to the correct height, there may be no need to adjust the angle and the height of the pole 2*a*, 2*b*.

In a sixth step of the method, the clamping means 8, 9 are used for fixing the pole 2*a*, 2*b* to the desired position. The nut 9 is thus tightened against the adjustment sleeve 8 by means of a wrench. When the pole 2*a*, 2*b* has been fixed to the desired position, parts of the fastening arrangement can be covered by exterior panels of the pole 2*a*, 2*b*.

Embodiments of the invention have been described above in connection with a pole 2*a*, 2*b* of a turnstile 1. However, the fastening arrangement according to the invention could also be applied to a pole of a destination control device. Destination control systems can be used in buildings that are equipped with several elevators to optimize the use of the elevators. Users of the elevators select their destination from a destination operating panel or with a mobile app, and the display of the operating panel tells each user which elevator has been assigned to him or her. The destination operating panel can be attached to a wall, but the operating panel can also be attached to a pole. The pole of a destination operating panel could be provided with the fastening arrangement described above.

The invention claimed is:

1. A fastening arrangement for fastening a pole of an access or destination control device to a floor structure, the fastening arrangement comprising at least one fastening rod having a lower end and an upper end, the fastening rod being attachable to the floor structure in an upright position and comprising a threaded portion with an external thread, a fastening sleeve having a lower end and an upper end and being arrangeable around the fastening rod, the fastening sleeve comprising a flange and a sleeve portion, the fastening sleeve being provided with an internal thread configured to be engaged with the external thread of the fastening rod, and the sleeve portion being provided with coupling means for allowing the upper end of the fastening sleeve to be engaged in a form-locking manner for rotation of the fastening sleeve, a fastening block arranged at a lower end of the pole of the access or destination control device and having a lower surface and an upper surface, the fastening block comprising a fastening hole extending from the lower surface to the upper surface, the fastening hole being configured to receive part of the fastening rod and at least part of the sleeve portion of the fastening sleeve arranged around the fastening rod so that the lower surface of the fastening block is supported by the flange of the fastening sleeve, and clamping means that are configured to be engaged with the upper surface of the fastening block and the thread of the fastening rod for clamping the fastening block between the flange of the fastening sleeve and the clamping means, wherein the clamping means directly engages with the thread of the fastening rod.

2. A fastening arrangement according to claim 1, wherein the lower end of the fastening rod is provided with an external thread for attaching the fastening rod to the floor structure.

3. A fastening arrangement according to claim 1, further comprising a mounting part that is attachable to the floor structure, the mounting part comprising a mounting sleeve for receiving the lower end of the fastening rod.

4. A fastening arrangement according to claim 1, wherein the coupling means of the fastening sleeve comprise at least one tooth extending upwards from an upper end surface of the sleeve portion or at least one notch extending downwards from the upper end surface.

5. A fastening arrangement according to claim 1, wherein the clamping means comprise a first part that is configured to be engaged with the upper surface of the fastening block and a second part that is configured to be engaged with the thread of the fastening rod for clamping the first part against the fastening block.

6. A fastening arrangement according to claim 5, wherein the first part of the clamping means is an adjustment sleeve, which is provided with coupling means that are configured to be engaged in a form-locking manner with the coupling means of the fastening sleeve for allowing rotation of the fastening sleeve by rotating the adjustment sleeve.

7. A fastening arrangement according to claim 6, wherein an outer perimeter of the adjustment sleeve comprises a portion with a hexagonal shape for allowing rotation of the adjustment sleeve by a wrench.

8. A fastening arrangement according to claim 5, wherein the second part of the clamping means is a nut.

9. A fastening arrangement according to claim 1, wherein the fastening arrangement comprises at least two of the fastening rods and a corresponding number of fastening sleeves, fastening holes and clamping means.

10. A fastening arrangement according to claim 9, wherein the fastening arrangement comprises three of the fastening rods, which are arranged in a triangular formation in a plane of the floor structure.

11. A fastening arrangement according to claim 4, wherein the coupling means includes a first portion along a first portion of an outer perimeter of the coupling means and having a first length along the sleeve portion, and a second portion along a second portion of the outer perimeter of the coupling means and having a second length along the sleeve portion, the second portion including the at least one tooth or the at least one notch.

12. A pole of an access or destination control device comprising a fastening arrangement according to claim 1.

13. An access control device comprising a pole according to claim 12.

14. A destination control device comprising a pole according to claim 12.

15. A method of mounting a pole of an access or destination control device comprising a fastening arrangement according to claim 1, the method comprising the steps of fastening the fastening rod(s) to the floor structure, arranging each fastening sleeve around a respective fastening rod at an initial position, supporting the pole against the flange(s) of the fastening sleeve(s), checking the angle and the height of the pole, optionally, adjusting the angle and/or the height of the pole by rotating at least one fastening sleeve, and using the clamping means for fixing the pole to the desired position.

* * * * *